United States Patent [19]

Aldag et al.

[11] Patent Number: 4,987,220

[45] Date of Patent: Jan. 22, 1991

[54] PURIFICATION OF POLY(N-VINYLCARBAZOLE) CONTAINING IMPURITIES

[75] Inventors: Reinhard Aldag, Eberbach; Peter Neumann, Mannheim, both of Fed. Rep. of Germany

[73] Assignee: BASF Aktiengesellschaft, Ludwigshafen, Fed. Rep. of Germany

[21] Appl. No.: 278,354

[22] Filed: Dec. 1, 1988

[30] Foreign Application Priority Data

Dec. 2, 1987 [DE] Fed. Rep. of Germany ....... 3740786

[51] Int. Cl.$^5$ .................................................. C08F 6/00
[52] U.S. Cl. .................................. 528/491; 528/493; 526/259
[58] Field of Search ................ 526/259; 528/486, 493, 528/491; 264/345

[56] References Cited

U.S. PATENT DOCUMENTS

| | | | |
|---|---|---|---|
| 2,072,465 | 3/1937 | Reppe et al. | 526/259 |
| 2,877,216 | 3/1959 | Fientscher et al. | 526/259 X |
| 3,313,746 | 4/1967 | Ellinger | 526/259 X |
| 3,679,637 | 7/1972 | Hort | 526/259 |

FOREIGN PATENT DOCUMENTS 1273233  5/1972  United Kingdom ................ 526/259

OTHER PUBLICATIONS

Polymer Journal, vol. 20, Jul. 7, 1979 pp. 533-539.
J. Appl. Chem., 9, Oct. 1959, pp. 553.

*Primary Examiner*—Fred Teskin
*Attorney, Agent, or Firm*—Keil & Weinkauf

[57] ABSTRACT

Poly-N-vinylcarbazole containing impurities is purified by a process in which the poly-N-vinylcarbazole to be purified is treated in a suitable apparatus at from 20° to 150° C. with an extracting agent.

3 Claims, No Drawings

PURIFICATION OF POLY(N-VINYLCARBAZOLE) CONTAINING IMPURITIES

The present invention relates to a process for the purification of poly(N-vinylcarbazole) containing impurities.

Poly(N-vinylcarbazole), PVCa, is a polymer material which has photoconductive properties and is therefore very important for electrophotographic applications.

The common feature of all industrial processes for the preparation of PVCa is that the product obtained is more or less impure polymer material which contains not only anthracene and other low molecular weight fractions but in particular the monomer in amounts of from 1 to 6%. As described in detail in Polymer Journal 20 (1979), 867–870, the purity has a decisive influence on various electrophotographic characteristics, such as photoconductivity, photosensitivity, contrast potential and the like. For example, a content of less than 100 ppm is required for the monomer vinylcarbazole.

The literature mentions methods for the purification of PVCa which essentially consist of a reprecipitation process. In these procedures, the polymer material is dissolved in a suitable solvent, such as dimethylformamide, tetrahydrofuran, benzene, toluene or methylene chloride, and is reprecipitated by adding an alcohol, preferably methanol.

Polymer Journal (loc. cit.) states that, starting from the commercially available crude product, about 5–10, preferably 12, purification cycles are required in order to obtain a suitable material (cf. in particular FIGS. 1 to 3 of page 868). The amounts of solvents which have to be handled in this procedure are unacceptable from economic and toxicological points of view. Furthermore, the precipitation process in large kettle units presents problems since the material readily coagulates.

It is an object of the present invention to provide a process for the purification of industrial PVCa which meets the electrophotographic purity requirements and does not have the disadvantages of the precipitation processes.

We have found that this object is achieved and that the abovementioned disadvantages can be avoided if the poly(N-vinylcarbazole) to be purified is treated in a suitable apparatus at from 20° to 150° C. with an extracting agent.

The present invention therefore relates to a process for the purification of poly(N-vinylcarbazole) containing impurities. In this process, the poly(N-vinylcarbazole) to be purified is treated in a suitable apparatus at from 20° to 150° C. with an extracting agent.

The novel process and the starting materials required to carry it out are described below.

Poly(N-vinylcarbazole) is a polymer which has long been known and which, regardless of its method of preparation, is contaminated with vinylcarbazole (about 1–6, in particular 3–4, % by weight), carbazole and anthracene (up to 500 ppm) and may be contaminated with sulfur compounds in the ppm range. The stated compounds or some of them, in particular vinylcarbazole, are regarded as impurities with respect to the process of this invention.

In the process according to the invention, poly(N-vinylcarbazole) is understood as meaning both homopolymers of N-vinylcarbazole and its copolymers, where the copolymers may contain up to 30% by weight of monomers which are copolymerizable with N-vinylcarbazole. Alkyl-substituted poly-N-vinylcarbazoles where alkyl is of 1 to 6 carbon atoms can also be used. Poly(N-vinylcarbazoles) which are halogenated in the nucleus, in particular chlorinated, are also suitable for use in the novel process. Finally, mixtures of the abovementioned group of substances can also be used. From the series comprising the abovementioned poly(N-vinylcarbazoles), in particular the homopolymer of N-vinylcarbazole is used. Methods for the preparation of poly(N-vinylcarbazoles) and data on the solubility and the thermal, mechanical and electrical properties of these substances are summarized in an article by W. Klopffer in Kunststoffe, 61 (1971), Part 8, 533–539.

Various polymerization processes are known for the preparation of poly(N-vinylcarbazole):

German Patent No. 931,731 describes, for example, block polymerization under inert gas under superatmospheric pressure, using a free radical initiator. Free radical polymerization in suspension is also possible (cf. J. Appl. Chem. 9 (1959), 553 or German Published Application DAS No. 1,918,594).

Cationic polymerization, for example according to German Laid-Open Application DOS No. 2,111,294, by acid catalysis in an inert solvent is also possible.

Another method is described in U.S. Pat. No. 2,072,465. Moreover, poly(N-vinylcarbazole) is available commercially (Luvican® from BASF Aktiengesellschaft). The poly(N-vinylcarbazoles) obtained from industrial processes usually have viscosity numbers, VN, of from 124 to 253 ml/g (measured on a 0.5% strength solution in tetrahydrofuran at 23° C.). This corresponds to number average molecular weights of from 284,000 to 346,000 and to weight average molecular weights of from 1.0 million to 2.4 million.

The process according to the invention is carried out using solid/liquid extraction. The principle and the apparatuses which are suitable for this purpose are known per se and are described for the continuous process and batchwise process, for example in Ullmanns Enzyklopädie der technischen Chemie, 4th Edition, 1972, Volume 2, pages 722–729, in the Chapter entitled Extraction of Solids. The novel process is preferably carried out by a continuous procedure, an apparatus based on the Soxhlet principle preferably being used for the purification.

In this procedure, the extracting agent is heated to the boil in a vessel. The ascending vapor reaches a condenser, is condensed there and then flows, if necessary through a thermostating unit, into the reactor loaded with the material to be extracted. After a certain residence time, which is determined by the dimensions of the reactor, the laden extracting agent runs back into the vessel.

According to the invention, suitable extracting agents for the poly(N-vinylcarbazole) are organic liquids which are non-solvents and do not cause pronounced swelling. Examples of these are polar liquids, ketones of 3 to 10 carbon atoms, such as acetone or methyl ethyl ketone, and the esters of aliphatic carboxylic acids where the carboxylic acid moiety is of 1 to 6 carbon atoms, such as ethyl acetate or butyl acetate, have proven particularly advantageous for the novel process. The esters, in particular ethyl acetate, are preferred. Mixtures of the stated solvents with one another or mixtures of the stated ketones and/or esters with a minor amount, in particular up to 30% by weight, based on the extracting agent mixture, of another organic liquid are also suitable.

The temperature at which the extraction is carried out depends on the extracting agent used. It is in particular from 20° to 100° C., preferably from 40° to 80° C.

The extraction time depends on the desired purity and on the particle size distribution of the material being extracted, the extraction temperature and the extracting agent, and is from 10 minutes to 100 hours in the batchwise procedure. When a Soxhlet apparatus is used, it is generally from 2 to 80 hours.

Compared with the conventional precipitation techniques, the novel process has the following advantages:

Only from 1/5 to 1/10 of the amount of solvent is required.

The time required is substantially shorter.

Only one solvent or solvent mixture is formed which is contaminated with the impurities and can be recovered by distillation or, after its composition has been readjusted to the desired one, can be reused. In contrast to the prior art solvent mixtures, a precipitating agent has not to be separated off.

The poly(N-vinylcarbazole) purified by the process according to the invention is suitable in a surprisingly advantageous manner for applications where its photoconductivity is relevant. After the addition of conventional sensitizers, it is very useful for the production of photoconductive films or sheets on conductive substrates or for electrophotographic image production and has improved properties in this respect compared with the known materials.

The impurities stated in the Examples and Comparative Experiment were determined by conventional gas chromatographic methods.

The Examples and the Comparative Experiment were carried out using an industrial poly(N-vinylcarbazole) from BASF Aktiengesellschaft (Luvican ® M 170), which contained 4.2% by weight of vinylcarbazole, 0.1% by weight of carbazole and anthracene in the ppm range as impurities. It had a particle size distribution of from 4 to 0.1 mm.

The Examples and the Comparative Experiment which follow illustrate the invention.

EXAMPLE 1

10 g of industrial PVCa were extracted in a standard Soxhlet apparatus with 300 ml of ethyl acetate. The temperature of the extracting agent on contact with the material being extracted was about 70° C.

The PVCa thus extracted contained only from 150 to 200 ppm of vinylcarbazole after 8 hours, and less than 50 ppm of vinylcarbazole were determined after 72 hours. The content of carbazole was below the detection limit.

EXAMPLE 2

The procedure was similar to that in Example 1, except that, instead of ethyl acetate, the same amount of methyl ethyl ketone was used. The temperature was about 60° C.

After 72 hours, the PVCa thus purified contained only 90 ppm of vinylcarbazole.

COMPARATIVE EXPERIMENT 10 g of industrial PVCa were completely dissolved in 200 ml of tetrahydrofuran in the course of 2 hours with heating. After the solution had been cooled, 100 ml of methanol were slowly added dropwise in two portions while stirring.

The precipitated polymer was filtered off under suction and dried. As described above, it was then dissolved again in tetrahydrofuran and precipitated. This process was repeated twice more, the entire procedure requiring 24 hours. After the fourth purification operation, the content of vinylcarbazole was 0.015%.

The vinylcarbazole content was as much as 0.1% by weight after the first operation and was still 0.04% by weight after the second operation.

We claim:

1. A process for the purification of poly(N-vinylcarbazole) or a copolymer of N-vinylcarbazole with up to 30 weight percent of at least one monomer copolymerizable therewith in a mixture containing the polymer in solid form and impurities, which process consists of extracting said poly(N-vinylcarbazole) or copolymer thereof in solid form continuously at a temperature of from 40 to 80° C. with an ester of aliphatic carboxylic acids wherein the carboxylic acid moiety is of 1 to 6 carbon atoms.

2. A process as set forth in claim 1, wherein the ester is ethyl acetate.

3. A process as claimed in claim 1, wherein the extraction is carried out in an apparatus based on a Soxhlet principle.

* * * * *